United States Patent
Liu

(10) Patent No.: US 11,283,578 B2
(45) Date of Patent: Mar. 22, 2022

(54) METHOD AND APPARATUS FOR CONTROLLING INTER-CELL SIGNAL INTERFERENCE, USER EQUIPMENT AND BASE STATION

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 42 days.

(21) Appl. No.: 16/630,237

(22) PCT Filed: Jul. 11, 2017

(86) PCT No.: PCT/CN2017/092501
§ 371 (c)(1),
(2) Date: Jan. 10, 2020

(87) PCT Pub. No.: WO2019/010632
PCT Pub. Date: Jan. 17, 2019

(65) Prior Publication Data
US 2020/0136788 A1 Apr. 30, 2020

(51) Int. Cl.
*H04L 5/00* (2006.01)
*H04W 28/16* (2009.01)
(Continued)

(52) U.S. Cl.
CPC .......... *H04L 5/0073* (2013.01); *H04L 5/0051* (2013.01); *H04L 5/10* (2013.01);
(Continued)

(58) Field of Classification Search
None
See application file for complete search history.

(56) References Cited

U.S. PATENT DOCUMENTS 10,756,802 B2 * 8/2020 Li .................... H04B 7/063
2015/0215085 A1 7/2015 Xu et al.
(Continued)

FOREIGN PATENT DOCUMENTS

CN 103906139 A 7/2014
CN 104144468 A 11/2014
(Continued)

OTHER PUBLICATIONS

ISA State Intellectual Property Office of the People's Republic of China, International Search Report Issued in Application No. PCT/CN2017/092501, dated Oct. 11, 2017, WIPO, 4 pages.
(Continued)

*Primary Examiner* — Ajit Patel
(74) *Attorney, Agent, or Firm* — Syncoda LLC; Feng Ma

(57) ABSTRACT

A method of controlling inter-cell signal interference includes: a subcarrier pattern of PBCH symbols for a present cell is generated based on an agreed DMRS configuration mode, every N resource elements in the subcarrier pattern of the PBCH symbols including one resource element for a DMRS and (N−1) resource elements for a PBCH, where N is a natural number greater than 2; a synchronization block of the present cell is generated based on the subcarrier pattern of the PBCH symbols for the present cell; and the synchronization block of the present cell is sent directionally by beam sweeping. As such, an interference problem caused by increased power due to improper configuration of cell reference signals in a 5G system can be solved.

15 Claims, 11 Drawing Sheets

(51) Int. Cl.
*H04L 5/10* (2006.01)
*H04W 16/28* (2009.01)
*H04W 56/00* (2009.01)
*H04W 72/00* (2009.01)

(52) U.S. Cl.
CPC ......... *H04W 16/28* (2013.01); *H04W 56/001* (2013.01); *H04W 72/005* (2013.01)

(56) References Cited

U.S. PATENT DOCUMENTS

| | | | |
|---|---|---|---|
| 2015/0341908 A1 | 11/2015 | Wang et al. | |
| 2017/0064685 A1* | 3/2017 | Rico Alvarino | H04L 5/005 |
| 2017/0288831 A1* | 10/2017 | Cezanne | H04L 25/0202 |
| 2017/0311276 A1* | 10/2017 | Tsai | H04W 48/16 |
| 2017/0353257 A1* | 12/2017 | Islam | H04J 11/0079 |
| 2018/0091341 A1* | 3/2018 | Sadiq | H04L 5/0053 |
| 2018/0359044 A1* | 12/2018 | Pirskanen | H04B 7/0617 |
| 2018/0368054 A1 | 12/2018 | Sheng et al. | |
| 2019/0013917 A1 | 1/2019 | Nam et al. | |
| 2019/0081688 A1* | 3/2019 | Deenoo | H04B 7/088 |
| 2019/0350028 A1* | 11/2019 | Kaasalainen | H04W 76/18 |
| 2020/0128498 A1* | 4/2020 | Harada | H04L 27/2649 |

FOREIGN PATENT DOCUMENTS

| | | |
|---|---|---|
| CN | 104995863 A | 10/2015 |
| CN | 105075369 A | 11/2015 |
| CN | 105531949 A | 4/2016 |
| CN | 105981322 A | 9/2016 |
| CN | 106464478 A | 2/2017 |
| CN | 106793125 A | 5/2017 |
| WO | 2014073928 A1 | 5/2014 |
| WO | 2018232240 A1 | 12/2018 |
| WO | 2019013986 A1 | 1/2019 |

OTHER PUBLICATIONS

LG Electronics, "NR PBCH Design", 3GPP TSG RAN WG1 NR Ad-Hoc Meeting, R1-1700460, Jan. 20, 2017, 10 pages.
NEC Group, "Evaluation of Enhanced DMRS Patterns", 3GPP TSG RAN WG1 Meeting, R1-131258, Apr. 19, 2013, 9 pages.
MediaTek Inc."Discussion on DL RRM Measurement", 3GPP TSG RAN WG1 Meeting#88bis, R1-1704440, Apr. 7, 2017, 5 pages.
CATT, "NR PBCH DMRS sequence design and RE mapping", 3GPP TSG RAN WG1 NR Ad-Hoc#2, R1-1710028, Jun. 30, 2017, 4 pages.
State Intellectual Property Office of the People's Republic of China, Office Action and Search Report Issued in Application No. 2017800007708, dated Nov. 27, 2019, 15 pages,(Submitted with Machine Translation).
State Intellectual Property Office of the People's Republic of China, Office Action and Search Report Issued in Application No. 2017800007708, dated May 18, 2020, 16 pages, (Submitted with Machine Translation).
European Patent Office, Partial Extended European Search Report Issued in Application No. 17917810.8, dated Jun. 22, 2020, Germany, 18 pages.
Sony, "Discussion on SS block time index indication", 3GPP TSG RAN WG1 NR Ad-Hoc#2, Qingdao, P.R. China, R1-1710858, Jun. 27-30, 2017, 6 pages.
ZTE, ZTE Microelectronics, "NR-PBCH Design", 3GPP TSG RAN WG1 Meeting #88 Athens, Greece, R1-1701577, Feb. 13-17, 2017, 11 pages.
ISA State Intellectual Property Office of the People's Republic of China, Written Opinion of the International Searching Authority Issued in Application No. PCT/CN2017/092501, dated Oct. 11, 2017, WIPO, 8 pages.
European Patent Office, Extended European Search Report Issued in Application No. 17917810.8, dated Sep. 24, 2020, Germany, 16 pages.
Intellectual property India, Office Action Issued in Application No. 202047005344, dated Jun. 25, 2021, 9 pages.

* cited by examiner

METHOD AND APPARATUS FOR CONTROLLING INTER-CELL SIGNAL INTERFERENCE, USER EQUIPMENT AND BASE STATION

CROSS-REFERENCE TO RELATED APPLICATION

This application is a national stage of International Application No. PCT/CN2017/092501 filed on Jul. 11, 2017, the disclosure of which is hereby incorporated by reference in its entirety.

TECHNICAL FIELD

The present disclosure relates to the field of wireless communication technology, and in particular, to a method and an apparatus for controlling inter-cell signal interference, user equipment, and a base station.

BACKGROUND

In a Long-Term Evolution (LTE) omnidirectional transmission system, User Equipment (UE) can measure a Reference Signal Receiving Power (RSRP) of a Cell-specific Reference Signal (CRS) to measure quality of signals in a cell.

In related art, in the research and discussion of the $5^{th}$ Generation (5G) project, there is no full-bandwidth CRS which is designed in the LTE, so a new measurement configuration scheme has to be proposed in a 5G system. For example, taking a secondary synchronization signal in a synchronization block and a Demodulation Reference Signal (DMRS) interspersed in a time domain of a Physical Broadcast Channel (PBCH) as a reference signal for a cell. However, a neighboring cell may use the same reference signal configuration in the frequency domain and the time domain, so the reference signal of the neighboring cell may cause an interference problem. In order to better avoid the problem of inter-cell interference, a new solution is to be proposed for the 5G system, to solve the problem of interference caused by increased power due to improper configuration of cell reference signals in the 5G system.

SUMMARY

In order to overcome problems in the related art, examples of the present disclosure provide a method and an apparatus for controlling inter-cell signal interference, user equipment, and a base station, which are used to solve an interference problem caused by increased power due to improper configuration of cell reference signals in a 5G system.

According to a first aspect of the examples of the present disclosure, a method of controlling inter-cell signal interference is provided, the method is applied to a base station and includes:

generating a subcarrier pattern of Physical Broadcast Channel (PBCH) symbols for a present cell based on an agreed Demodulation Reference Signal (DMRS) configuration mode, every N resource elements in the subcarrier pattern of the PBCH symbols including one resource element for a DMRS and (N−1) resource elements for a PBCH, wherein N is a natural number greater than 2;

generating a synchronization block of the present cell based on the subcarrier pattern of the PBCH symbols for the present cell; and sending the synchronization block of the present cell directionally by beam sweeping.

In an example, the method further includes:

s setting a transmission window corresponding to the synchronization block of the present cell to be different from a transmission window corresponding to a synchronization block of a neighboring cell; and/or setting a position of a starting resource element of a DMRS in the synchronization block of the present cell to be different from a position of a starting resource element of the DMRS carried in the synchronization block of the neighboring cell.

In an example, the method further includes:

sending system information carrying configuration information of a cell reference signal for a neighboring cell to User Equipment (UE), where the configuration information includes a position of a starting resource element of a DMRS in a synchronization block of the neighboring cell.

In an example, the agreed DMRS configuration mode includes:

the DMRSs being evenly interspersed across a full bandwidth of the PBCH; or the DMRSs being interspersed across the bandwidth of the PBCH except a portion coincident with a bandwidth of a secondary synchronization signal in the synchronization block.

According to a second aspect of the examples of the present disclosure, a method of controlling inter-cell signal interference is provided, the method is applied to user equipment and includes:

monitoring a synchronization block;

determining a position of a starting resource element of a DMRS for demodulating a PBCH carried in the synchronization block;

acquiring the DMRS based on the position of the starting resource element; and demodulating the PBCH based on the DMRS to obtain PBCH content of the PBCH.

In an example, determining the position of the starting resource element of the DMRS for demodulating the PBCH carried in the synchronization block includes:

when the synchronization block is a synchronization block from a cell where the UE is to reside or a present cell associated with the UE, determining the position of the starting resource element of the DMRS by position blind decoding.

In an example, determining the position of the starting resource element of the DMRS for demodulating the PBCH carried in the synchronization block includes:

when the synchronization block is a synchronization block from a neighboring cell of the present cell where the UE resides, determining the position of the starting resource element of the DMRS based on configuration information of a cell reference signal for the neighboring cell.

In an example, the method further includes:

receiving system information sent by a base station and carrying the configuration information of the cell reference signal for the neighboring cell, where the configuration information of the cell reference signal for the neighboring cell includes a position of a starting resource element of a DMRS carried in the synchronization block of the neighboring cell; and analyzing the system information to obtain the configuration information of the cell reference signal for the neighboring cell.

In an example, determining the position of the starting resource element of the DMRS for demodulating the PBCH carried in the synchronization block includes:

when the synchronization block is a synchronization block from a macro cell, determining the position of the starting resource element of the DMRS based on a system agreement.

In an example, determining the position of the starting resource element of the DMRS for demodulating the PBCH carried in the synchronization block includes:

when the synchronization block is a synchronization block from a hotspot cell, determining the position of the starting resource element of the DMRS based on configuration information of a cell reference signal for the hotspot cell.

In an example, the method further includes:

receiving system information sent by a base station of the macro cell and carrying the configuration information of the cell reference signal for the hotspot cell, where the configuration information of the cell reference signal for the hotspot cell includes a position of a starting resource element of a DMRS carried in the synchronization block of the hotspot cell; and analyzing the system information to obtain the configuration information of the cell reference signal for the hotspot cell.

According to a third aspect of the examples of the present disclosure, an apparatus for controlling inter-cell signal interference is provided, and the apparatus includes:

a first generating module configured to generate a subcarrier pattern of PBCH symbols for a present cell based on an agreed DMRS configuration mode, every N resource elements in the subcarrier pattern of the PBCH symbols including one resource element for a DMRS and (N−1) resource elements for a PBCH, where N is a natural number greater than 2;

a second generating module configured to generate a synchronization block of the present cell based on the subcarrier pattern of the PBCH symbols for the present cell, generated by the first generating module; and a first sending module configured to send the synchronization block of the present cell, generated by the second generating module, directionally by beam sweeping.

In an example, the apparatus further includes:

a setting module configured to set a transmission window corresponding to the synchronization block of the present cell to be different from a transmission window corresponding to a synchronization block of a neighboring cell, and/or set a position of a starting resource element of a DMRS in the synchronization block of the present cell to be different from a position of a starting resource element of the DMRS carried in the synchronization block of the neighboring cell.

In an example, the apparatus further includes:

a second sending module configured to send system information carrying configuration information of a cell reference signal for a neighboring cell to UE, where the configuration information includes a position of a starting resource element of a DMRS in a synchronization block of the neighboring cell.

In an example, the agreed DMRS configuration mode includes:

the DMRSs being evenly interspersed across a full bandwidth of the PBCH; or the DMRSs being interspersed across the bandwidth of the PBCH except a portion coincident with a bandwidth of a secondary synchronization signal in the synchronization block.

In an example, the first sending module is configured to send the synchronization block in each direction on a transmission window agreed on in a system.

According to a fourth aspect of the examples of the present disclosure, an apparatus for controlling inter-cell signal interference is provided, the apparatus is applied to user equipment and includes:

a monitoring module configured to monitor a synchronization block;

a determining module configured to determine a position of a starting resource element of a DMRS for demodulating a PBCH carried in the synchronization block, which is monitored by the monitoring module;

an acquiring module configured to acquire the DMRS based on the position of the starting resource element, which is determined by the determining module; and a demodulating module configured to demodulate the PBCH based on the DMRS, which is acquired by the acquiring module, to obtain PBCH content of the PBCH.

In an example, the determining module includes:

a first determining sub-module configured to, when the synchronization block is a synchronization block from a cell where the UE is to reside or a present cell associated with the UE, determine the position of the starting resource element of the DMRS by position blind decoding.

In an example, the determining module includes:

a second determining sub-module configured to, when the synchronization block is a synchronization block from a neighboring cell of the present cell where the UE resides, determine the position of the starting resource element of the DMRS based on configuration information of a cell reference signal for the neighboring cell.

In an example, the apparatus further includes:

a first receiving module configured to receive system information sent by a base station and carrying the configuration information of the cell reference signal for the neighboring cell, where the configuration information of the cell reference signal for the neighboring cell includes a position of a starting resource element of a DMRS carried in the synchronization block of the neighboring cell; and a first analyzing module configured to analyze the system information, received by the first receiving module, to obtain the configuration information of the cell reference signal for the neighboring cell.

In an example, the determining module includes:

a third determining sub-module configured to, when the synchronization block is a synchronization block from a macro cell, determine the position of the starting resource element of the DMRS based on a system agreement.

In an example, the determining module includes:

a fourth determining sub-module configured to, when the synchronization block is a synchronization block from a hotspot cell, determine the position of the starting resource element of the DMRS based on configuration information of a cell reference signal for the hotspot cell.

In an example, the apparatus further includes:

a second receiving module configured to receive system information sent by a base station of the macro cell and carrying the configuration information of the cell reference signal for the hotspot cell, where the configuration information of the cell reference signal for the hotspot cell includes a position of a starting resource element of a DMRS carried in the synchronization block of the hotspot cell; and a second analyzing module configured to analyze the system information, received by the second receiving module, to obtain the configuration information of the cell reference signal for the hotspot cell.

According to a fifth aspect of the examples of the present disclosure, a base station is provided, and the base station includes:

a processor; and a memory for storing instructions executable by the processor, where the processor is configured to:

generate a subcarrier pattern of PBCH symbols for a present cell based on an agreed DMRS configuration mode, every N resource elements in the subcarrier pattern of the PBCH symbols including one resource element for a DMRS and (N−1) resource elements for a PBCH, where N is a natural number greater than 2;

generate a synchronization block of the present cell based on the subcarrier pattern of the PBCH symbols for the present cell; and send the synchronization block of the present cell directionally by beam sweeping.

According to a sixth aspect of the examples of the present disclosure, user equipment is provided, the user equipment includes:

a processor; and a memory for storing instructions executable by the processor, where the processor is configured to:

monitor a synchronization block;

determine a position of a starting resource element of a DMRS for demodulating a PBCH carried in the synchronization block;

acquire the DMRS based on the position of the starting resource element; and demodulate the PBCH based on the DMRS to obtain PBCH content of the PBCH.

According to a seventh aspect of the examples of the present disclosure, a non-transitory computer-readable storage medium storing computer instructions is provided, when the instructions are executed by a processor, cause the processor to:

generate a subcarrier pattern of PBCH symbols for a present cell based on an agreed DMRS configuration mode, every N resource elements in the subcarrier pattern of the PBCH symbols including one resource element for a DMRS and (N−1) resource elements for a PBCH, where N is a natural number greater than 2;

generate a synchronization block of the present cell based on the subcarrier pattern of the PBCH symbols for the present cell; and send the synchronization block of the present cell directionally by beam sweeping.

According to an eighth aspect of the examples of the present disclosure, a non-transitory computer-readable storage medium storing computer instructions is provided, when the instructions are executed by a processor, cause the processor to:

monitor a synchronization block;

determine a position of a starting resource element of a DMRS for demodulating a PBCH carried in the synchronization block;

acquire the DMRS based on the position of the starting resource element; and demodulate the PBCH based on the DMRS to obtain PBCH content of the PBCH.

The technical solutions provided by the examples of the present disclosure may include the following beneficial effects.

The base station can generate the subcarrier pattern of the PBCH symbols for the present cell based on the agreed DMRS configuration mode, and then generate the synchronization block of the present cell, which is sent directionally by beam sweeping. By generating the subcarrier pattern for the present cell based on the agreed DMRS configuration mode, the density of the DMRS in the subcarrier pattern can be reduced, thereby solving the interference problem caused by increased power due to improper configuration of cell reference signals in the synchronization block, and avoiding signal interference between neighboring cells.

It is to be understood that the above general descriptions and the below detailed descriptions are merely exemplary and explanatory, and are not intended to limit the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION

Figure 1A:
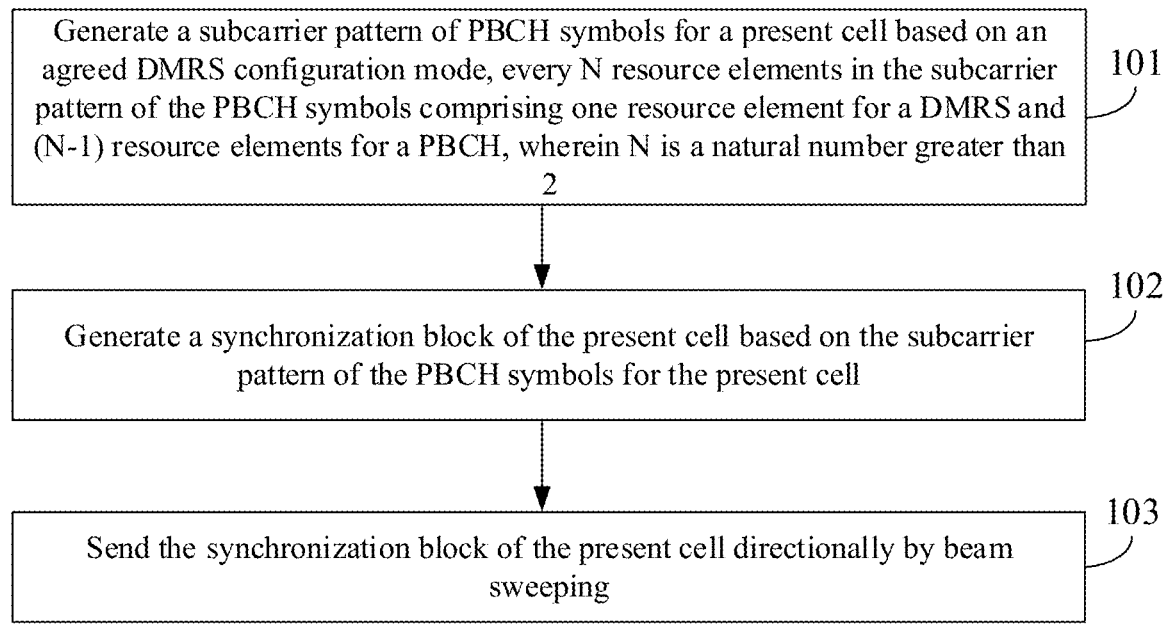
FIG. 1A is a flowchart illustrating a method of controlling inter-cell signal interference according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

Figure 1B:
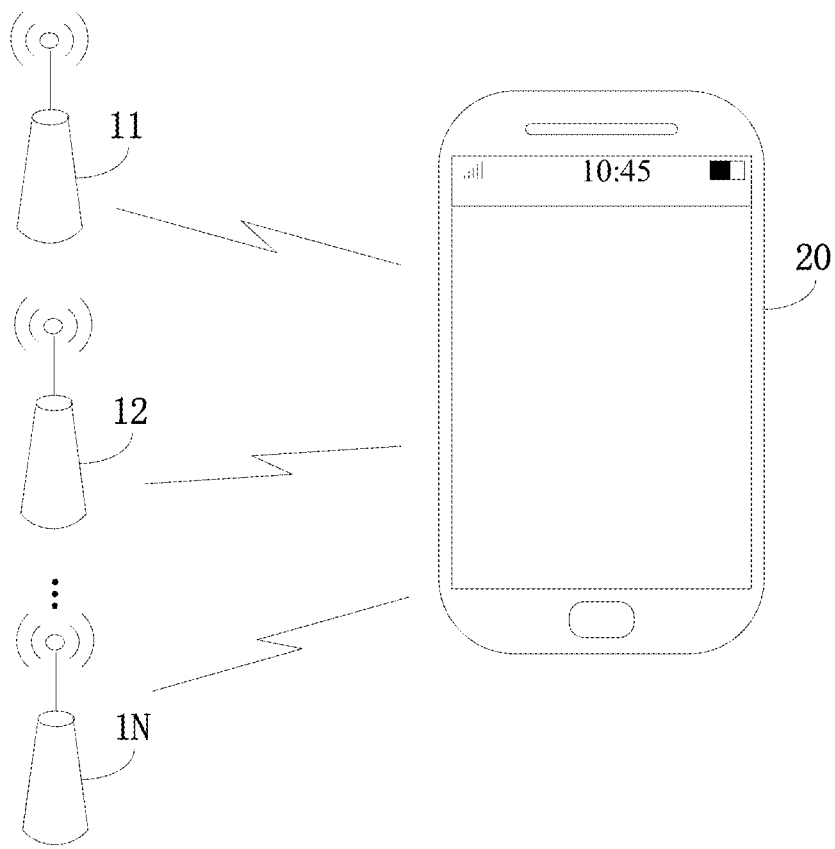
FIG. 1B is a scenario diagram illustrating a method of controlling inter-cell signal interference according to an example.
Figure 1C:
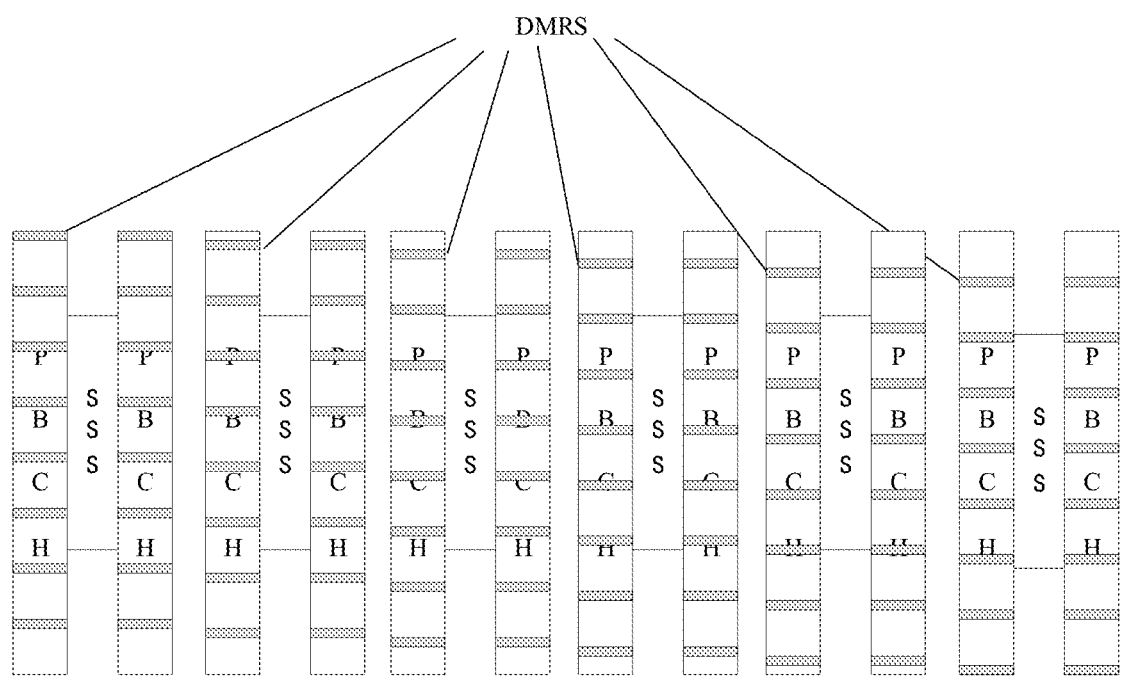
FIG. 1C is a schematic structural diagram illustrating synchronization blocks for a present cell and a neighboring cell used in a method of controlling inter-cell signal interference according to an example.
Figure 1D:
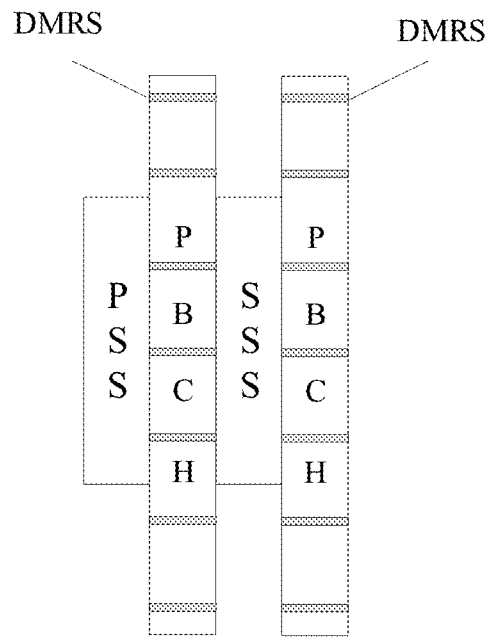
FIG. 1D is a first schematic structural diagram illustrating a synchronization block according to an example.
Figure 1E:
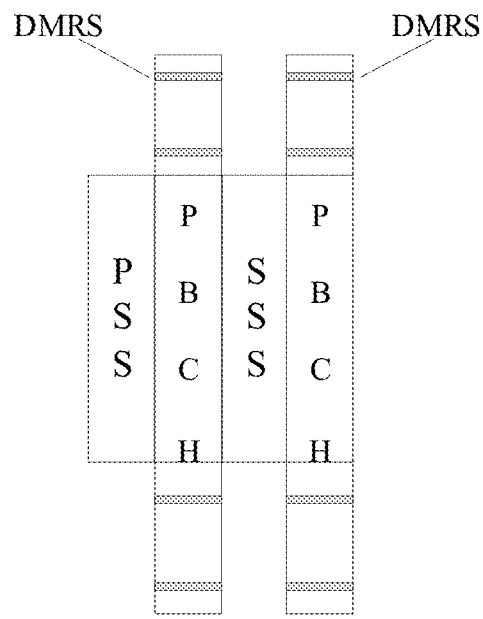
FIG. 1E is a second schematic structural diagram illustrating a synchronization block according to an example.

In an example, referring to FIG. 1D and FIG. 1E for a structure of a synchronization block, which includes a primary synchronization signal (PSS), a secondary synchronization signal (SSS), a PBCH, and a DMRS interspersed in a frequency domain. In an example, the DMRS may generally be a cyclic shift sequence, which is generated by a ZC (Zadoff-Chu) sequence generation algorithm.

FIG. 1A is a flowchart illustrating a method of controlling inter-cell signal interference according to an example. FIG. 1B is a scenario diagram illustrating a method of controlling inter-cell signal interference according to an example. FIG. 1C is a schematic structural diagram illustrating synchronization blocks for a present cell and a neighboring cell used in a method of controlling inter-cell signal interference according to an example. FIG. 1D is a first schematic structural diagram illustrating a synchronization block according to an example. FIG. 1E is a second schematic structural diagram illustrating a synchronization block according to an example. The method of controlling inter-cell signal interference can be applied to a base station, and as shown in FIG. 1A, the method of controlling inter-cell signal interference includes the following steps 101-103.

At step 101, a subcarrier pattern of PBCH symbols for a present cell is generated based on an agreed DMRS configuration mode, every N resource elements in the subcarrier pattern of the PBCH symbols including one resource element for a DMRS and (N−1) resource elements for a PBCH, where N is a natural number greater than 2.

In an example, the agreed DMRS configuration mode may be understood as a DMRS design mode. The DMRS can be designed according to modulo N, where N is a natural number greater than 2. For example, if the DMRS is designed according to modulo 6, it means that the subcarrier pattern of the PBCH symbols includes a DMRS occupying one resource element and a PBCH occupying 5 resource elements. If it is designed according to modulo 4, it means that the subcarrier pattern of the PBCH symbols includes the DMRS occupying one resource element and the PBCH occupying 3 resource elements.

In an example, the agreed DMRS configuration mode may be understood as a distribution mode of DMRSs across a full bandwidth of the PBCH, in which the DMRSs are evenly interspersed across the full bandwidth of the PBCH, as shown in FIG. 1D. Or, the DMRSs are interspersed across the bandwidth of the PBCH except a portion coincident with a bandwidth of the secondary synchronization signal in the synchronization block, as shown in FIG. 1E.

In an example, there may be N positions as a starting resource element of the DMRS, and the positions of the starting resource element for neighboring cells can be different, thereby reducing the interference between DMRSs for the neighboring cells. As shown in FIG. 1C, a DMRS configuration mode with N being 6 is shown. When N is 6, there are 6 positions that can be the position of the starting resource element of the DMRS, for example, the positions of the first, second, third, fourth, fifth, and sixth resource elements from the top may be used as the position of the starting resource element, thus forming 6 kinds of subcarrier patterns, and neighboring cells can use different subcarrier patterns, thereby reducing the interference between DMRSs for neighboring cells.

In an example, the position of the starting resource element of the DMRS for each cell may be agreed on, and the base station does not indicate it to UE through system information. For example, for each macro cell, the system may agree on the position of the starting resource element of the DMRS corresponding to the macro cell. In an example, the position of the starting resource element of the DMRS of each cell may be indicated by the base station to the UE through system information. For example, a position of a starting resource element of a DMRS for a hotspot cell can be indicated by the base station of the macro cell through system information to the hotspot cell base station, or a present cell base station indicates a position of the starting resource element of the DMRS for the neighboring cell to the UE through system information.

At step 102, a synchronization block of the present cell is generated based on the subcarrier pattern of the PBCH symbols for the present cell.

In an example, the subcarrier pattern generated at step 101 may be used to generate a PBCH and a DMRS, which is used for demodulating the PBCH, so that a synchronization block can be generated.

At step 103, the synchronization block of the present cell is sent directionally by beam sweeping.

In an example, the base station may send the synchronization block in each direction by beam sweeping on a transmission window agreed on in a system.

In an example, the base station may preset a transmission window corresponding to the synchronization block of the present cell to be different from a transmission window corresponding to a synchronization block of a neighboring cell; and/or, preset a position of the starting resource element of the DMRS in the synchronization block of the present cell to be different from a position of a starting resource element of a DMRS carried in the synchronization block of the neighboring cell. That is, it ensured that the DMRSs for the cells cannot be the same in both of the time domain and the frequency domain, to further avoid the interference problem between DMRSs for the present cell and the neighboring cell.

In an exemplary scenario, as shown in FIG. 1B, the scenario shown in FIG. 1B includes base station 11, base station 12, . . . , base station 1N, and UE (such as a smartphone, a tablet, etc.) 20. Base station 11, base station 12, . . . , and base station 1N can be understood as base stations of neighboring cells. UE 20 can monitor synchronization blocks sent by base station 11, base station 12, . . . , and base station 1N. In order to avoid interference generated among DMRSs in the synchronization blocks sent by base station 11, base station 12, . . . , and base station 1N, unique configuration modes can be designed for the DMRSs to ensure that the transmission windows corresponding to the synchronization blocks broadcast by different base stations are different and/or the positions of the starting resource elements of the DMRSs carried in the synchronization blocks are different.

In this example, through the above steps 101 to 103, the base station can generate the subcarrier pattern of the PBCH symbols for the present cell based on the agreed DMRS configuration mode, and then generate the synchronization block of the present cell, which is sent directionally by beam sweeping. By generating the subcarrier pattern for the present cell based on the agreed DMRS configuration mode, the density of the DMRS in the subcarrier pattern can be reduced, thereby solving the interference problem caused by increased power due to improper configuration of cell reference signals in the synchronization block, and avoiding signal interference between neighboring cells.

In an example, the method of controlling inter-cell signal interference may further include:

setting a transmission window corresponding to the synchronization block of the present cell to be different from a transmission window corresponding to a synchronization block of a neighboring cell; and/or setting a position of a starting resource element of a DMRS in the synchronization block of the present cell to be different from a position of a starting resource element of the DMRS carried in the synchronization block of the neighboring cell.

In an example, the method of controlling inter-cell signal interference may further include:

sending system information carrying configuration information of a cell reference signal for a neighboring cell to User Equipment (UE), where the configuration information includes a position of a starting resource element of a DMRS in a synchronization block of the neighboring cell.

In an example, the agreed DMRS configuration mode includes:

the DMRSs being evenly interspersed across a full bandwidth of the PBCH; or the DMRSs being interspersed across the bandwidth of the PBCH except a portion coincident with a bandwidth of a secondary synchronization signal in the synchronization block.

For details about how to control the inter-cell signal interference, reference can be made to the subsequent examples.

The following describes the technical solutions provided by the examples of the present disclosure with specific examples.

Figure 2:
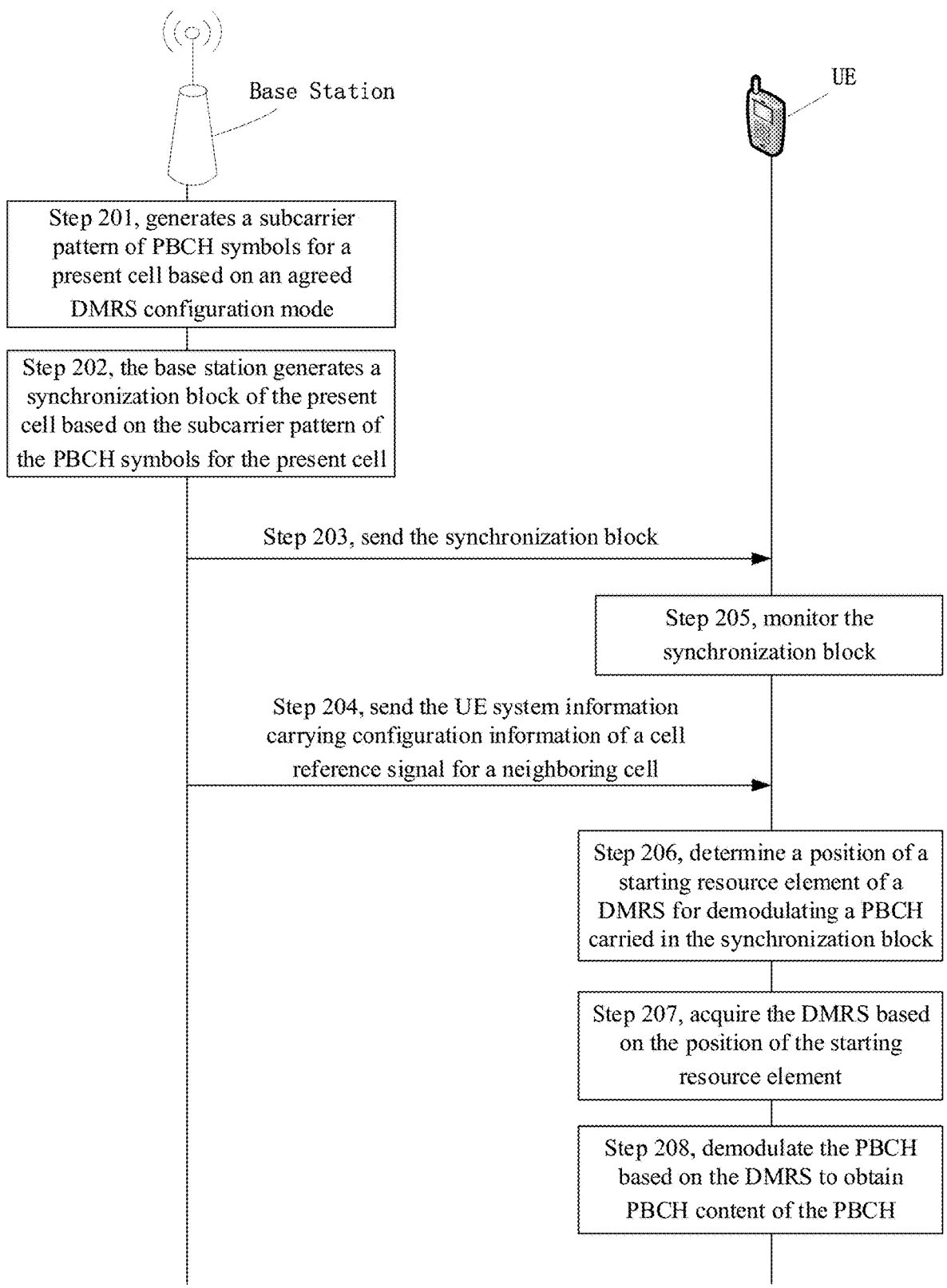
FIG. 2 is a flowchart illustrating another method of controlling inter-cell signal interference according to an example.

FIG. 2 is a flowchart illustrating another method of controlling inter-cell signal interference according to an example. This example takes, with the above-mentioned method provided in the example of the present disclosure, interaction between a base station and UE to implement controlling the inter-cell measurement signal interference as an example for illustrative description. As shown in FIG. 2, the method includes the following steps.

At step 201, the base station generates a subcarrier pattern of PBCH symbols for a present cell based on an agreed DMRS configuration mode.

In an example, every N resource elements in the subcarrier pattern of the PBCH symbols includes one resource element for a DMRS and (N-1) resource elements for a PBCH, where N is a natural number greater than 2.

At step 202, the base station generates a synchronization block of the present cell based on the subcarrier pattern of the PBCH symbols for the present cell.

At step 203, the base station sends the synchronization block, and step 205 is performed.

In an example, a transmission window corresponding to the synchronization block of the present cell is different from a transmission window corresponding to a synchronization block of a neighboring cell, and/or a position of a starting resource element of a DMRS carried in the synchronization block of the present cell is different from a position of a starting resource element of a DMRS carried in the synchronization block of the neighboring cell.

In an example, for the details of steps 201 and 202, reference may be made to the descriptions of steps 101 and 102 in the example shown in FIG. 1A, which will not be described here.

At step 204, the base station sends the UE system information carrying configuration information of a cell reference signal for a neighboring cell, and the configuration information of the cell reference signal for the neighboring cell includes a position of a starting resource element of a DMRS carried in a synchronization block of the neighboring cell, and step 206 is performed.

In an example, the base station of the present cell to which the UE accesses may send the UE the system information carrying the configuration information of the cell reference signal for the neighboring cell, so that when receiving the synchronization block from the neighboring cell, the UE can determine the position of the DMRS in the synchronization block based on the corresponding configuration information of the cell reference signal, so as to demodulate the PBCH symbols.

In an example, the configuration information of the cell reference signal can be understood as the subcarrier pattern of the PBCH symbols for the neighboring cell, such as the position of the starting resource element of the DMRS and the density of the DMRS. The density of the DMRS can be understood as a ratio of the number of resource elements occupied by the DMRS against that occupied by the PBCH in the PBCH symbols.

At step 205, the UE monitors the synchronization block.

At step 206, the UE determines the position of the starting resource element of the DMRS for demodulating the PBCH carried in the synchronization block.

In an example, when the UE does not obtain the position of the starting resource element of the DMRS in advance, the UE may determine the position of the starting resource element of the DMRS through a blind decoding manner. For example, if the DMRS configuration mode is designed according to modulo 6, and the position of the starting resource element can be determined through no more than 6 times of blind decoding.

In an example, the position of the starting resource element of the DMRS may be determined based on system agreement. For example, for a macro cell, the position of the starting resource element of the DMRS may be determined based on the system agreement, such as the position of the starting resource element of the DMRS corresponding to the macro cell is the first resource element.

In an example, the position of the starting resource element of the DMRS may be determined based on the configuration information of the cell reference signal configured in the system information. For example, for a hotspot cell or a neighboring cell, the position of the starting resource element of the DMRS for the hotspot cell or the neighboring cell may be determined based on the configuration information of the cell reference signal in the system information from the present cell.

In an example, a procedure for the UE to determine the position of the starting resource element of the DMRS carried in the synchronization block for demodulating the PBCH can be referred to the descriptions shown in FIG. 4A, FIG. 4B, FIG. 5A, and FIG. 5B, and will not be described in detail here.

At step 207, the UE acquires the DMRS based on the position of the starting resource element.

At step 208, the UE demodulates the PBCH based on the DMRS to obtain PBCH content of the PBCH.

In an example, a sequence of blind decoding may be performed on the acquired DMRS, and then the DMRS is determined, and then the PBCH is demodulated to obtain PBCH content of the PBCH.

In this example, through the above steps 201 to 208, the base station can generate the subcarrier pattern of the PBCH symbols for the present cell based on the agreed DMRS configuration mode, and send the synchronization block carrying the PBCH of the present cell and the DMRS for demodulating the PBCH in the transmission window of the synchronization block corresponding to the present cell. Upon monitoring the synchronization block, the UE may first determine the position of the starting resource element of the DMRS, and then can successfully demodulate the PBCH. Therefore, by configuring the DMRS, the time domain resource and the frequency domain resource conflict between the cell reference signals in the synchronization blocks for the present cell and the neighboring cell may be avoid, and the interference problem caused by increased power due to improper configuration of cell reference signals in the 5G system may be solved.

Figure 3:
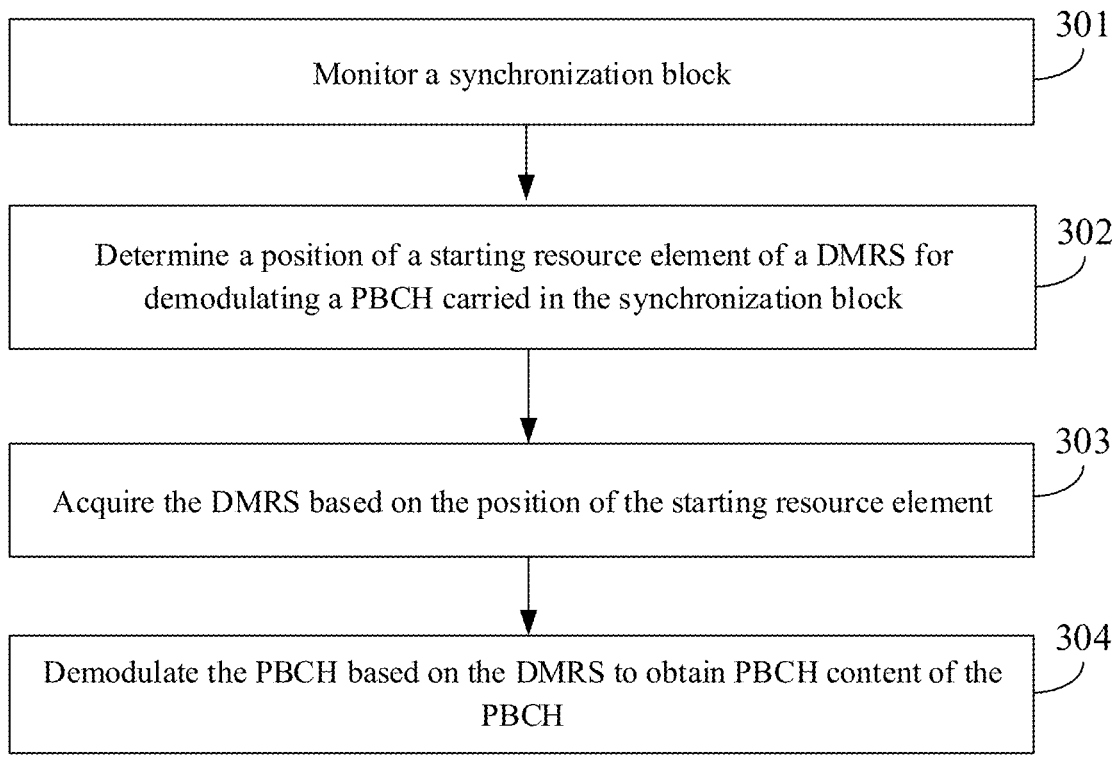
FIG. 3 is a flowchart illustrating a method of controlling inter-cell signal interference according to an example.

FIG. 3 is a flowchart illustrating a method of controlling inter-cell signal interference according to an example. The method of controlling inter-cell signal interference may be applied to UE. As shown in FIG. 3, the method of controlling inter-cell signal interference includes the following steps 301-304.

At step 301, a synchronization block is monitored.

At step 302, a position of a starting resource element of a DMRS is determined, which is carried in the synchronization block and used for demodulating a PBCH.

In an example, the position of the starting resource element of the DMRS in the synchronization block can be determined based on two manners.

Manner 1. When the UE does not determine in advance the position of the starting resource element of the DMRS in the synchronization block of any cell, reference can be made to the examples shown in FIG. 4A and FIG. 4B to determine the position of the starting resource element of the DMCH signal for demodulating the PBCH carried in the synchronization block, which will not be described here.

Manner 2. When a system previously agrees on a position of the starting resource element of the DMRS for each macro cell, and while a position of the starting resource element of the DMRS for the hotspot cell is not previously agreed on in the system, reference can be made to the examples shown in FIG. 5A and FIG. 5B to determine the position of the starting resource element of the DMRS for demodulating the PBCH carried in the synchronization block, which will not be described here.

At step 303, the DMRS is acquired based on the position of the starting resource element.

At step 304, the PBCH is demodulated based on the DMRS to obtain PBCH content of the PBCH.

In an exemplary scenario, as shown in FIG. 1B, the scenario shown in FIG. 1B includes base station 11, base station 12, . . . , base station 1N, and UE (such as a smartphone, a tablet, etc.) 20. Base station 11, base station 12, . . . , and base station 1N can be understood as base stations of neighboring cells. UE 20 can monitor synchronization blocks sent by base station 11, base station 12, . . . , and base station 1N. In order to avoid interference generated among DMRSs in the synchronization blocks sent by base station 11, base station 12, . . . , and base station 1N, unique configuration modes can be designed for the DMRSs to ensure that the transmission windows corresponding to the synchronization blocks broadcast by different base stations are different and/or the positions of the starting resource elements of the DMRSs carried in the synchronization blocks are different. Upon monitoring a synchronization block, UE 20 can first determine the cell to which the synchronization block belongs, and then determine a position of a starting resource element of a corresponding DMRS, thereby avoiding the time domain resource and the frequency domain resource conflict between cell reference signals in the synchronization blocks for a present cell and a neighboring cell, and solving the interference problem caused by increased power due to improper configuration of cell reference signals in the 5G system.

In this example, through the above steps 301 to 304, upon monitoring the synchronization block, the UE can first determine the position of the starting resource element of the DMRS, and then can obtain the PBCH through analyzing. Therefore, by configuring different subcarrier patterns of PBCH symbols for neighboring cells, it can avoid the time domain resource and the frequency domain resource conflict between the cell reference signals in the synchronization blocks for the present cell and the neighboring cell, and solve t the interference problem caused by increased power due to improper configuration of cell reference signals in the 5G system.

In an example, determining the position of the starting resource element of the DMRS for demodulating the PBCH carried in the synchronization block includes:

when the synchronization block is a synchronization block from a cell where the UE is to reside or a present cell associated with the UE, determining the position of the starting resource element of the DMRS by position blind decoding.

In an example, determining the position of the starting resource element of the DMRS for demodulating the PBCH carried in the synchronization block includes:

when the synchronization block is a synchronization block from a neighboring cell of the present cell where the UE resides, determining the position of the starting resource element of the DMRS based on configuration information of a cell reference signal for the neighboring cell.

In an example, the method of controlling inter-cell signal interference may further include:

receiving system information sent by a base station and carrying the configuration information of the cell reference signal for the neighboring cell, where the configuration information of the cell reference signal for the neighboring cell includes a position of a starting resource element of a DMRS carried in the synchronization block of the neighboring cell; and analyzing the system information to obtain the configuration information of the cell reference signal for the neighboring cell.

In an example, determining the position of the starting resource element of the DMRS for demodulating the PBCH carried in the synchronization block includes:

when the synchronization block is a synchronization block from a macro cell, determining the position of the starting resource element of the DMRS based on a system agreement.

In an example, determining the position of the starting resource element of the DMRS for demodulating the PBCH carried in the synchronization block includes:

when the synchronization block is a synchronization block from a hotspot cell, determining the position of the starting resource element of the DMRS based on configuration information of a cell reference signal for the hotspot cell.

In an example, the method of controlling inter-cell signal interference may further include:

receiving system information sent by a base station of the macro cell and carrying the configuration information of the cell reference signal for the hotspot cell, where the configuration information of the cell reference signal for the hotspot cell includes a position of a starting resource element of a DMRS carried in the synchronization block of the hotspot cell; and analyzing the system information to obtain the configuration information of the cell reference signal for the hotspot cell.

For details about the inter-cell signal interference control, reference can be made to the subsequent examples.

The following describes the technical solutions provided by the examples of the present disclosure with specific examples.

Figure 4A:
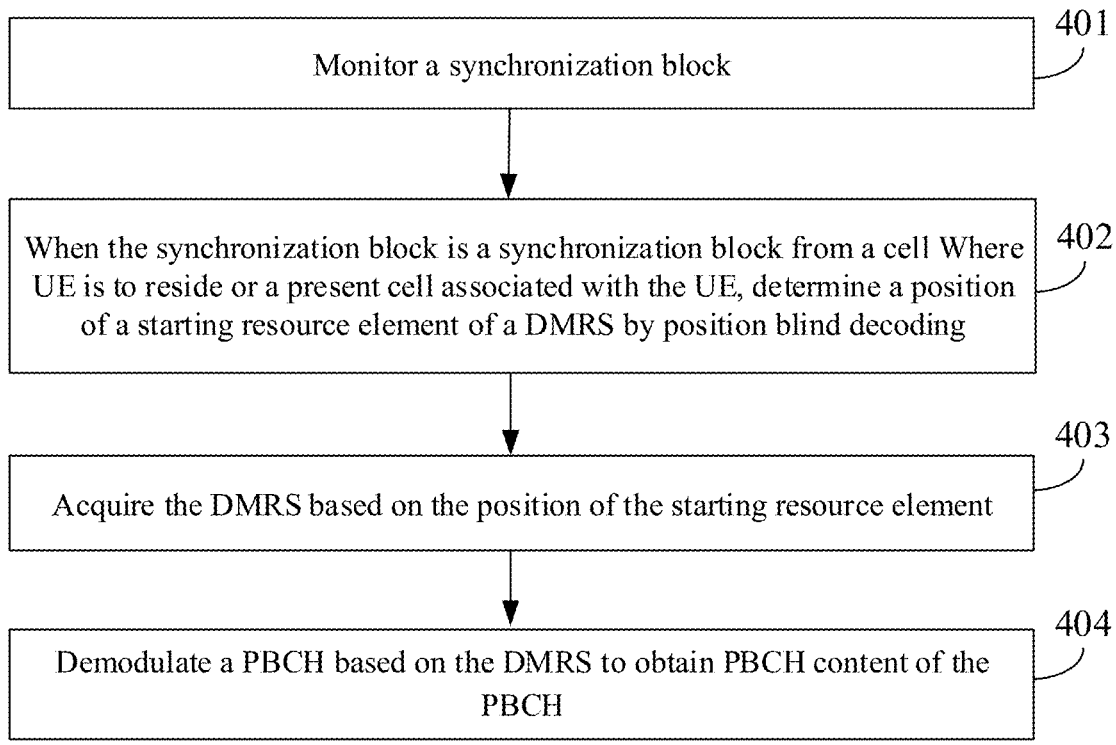
FIG. 4A is a first flowchart illustrating another method of controlling inter-cell signal interference according to an example.
Figure 4B:
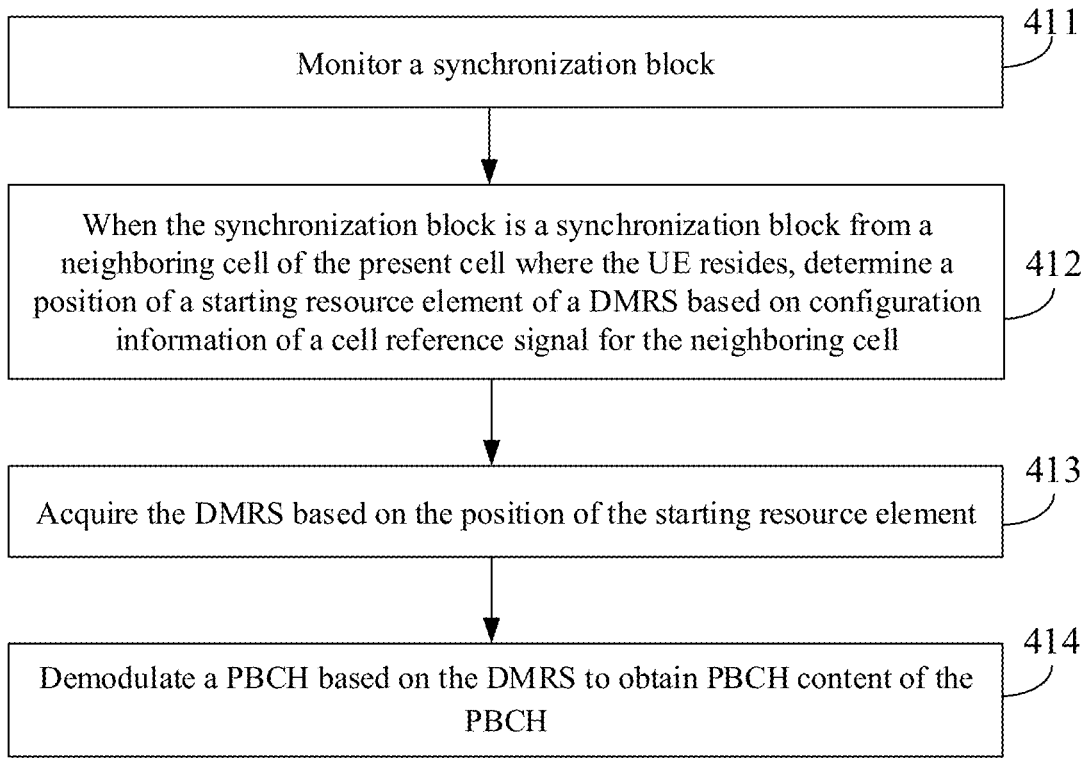
FIG. 4B is a second flowchart illustrating another method of controlling inter-cell signal interference according to an example.
Figure 4C:
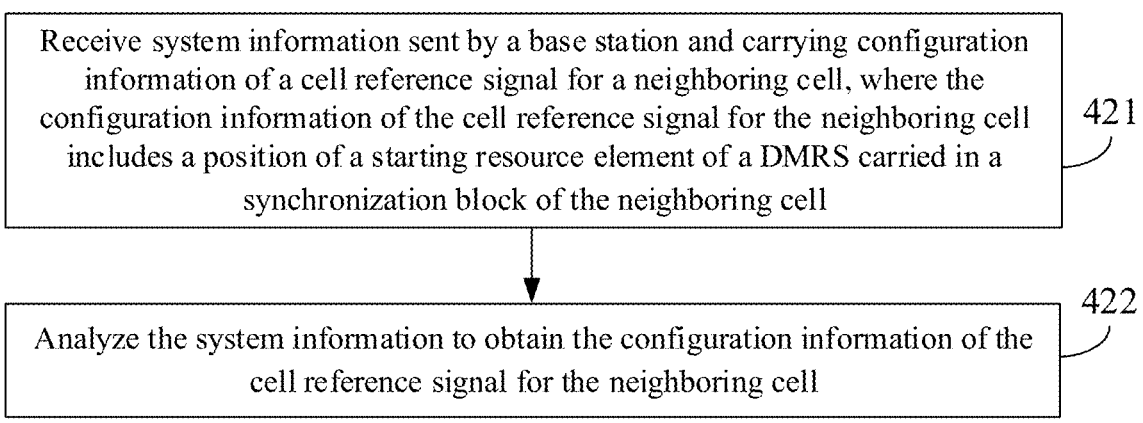
FIG. 4C is a flowchart illustrating acquiring configuration information of a cell reference signal according to an example.

FIG. 4A is a first flowchart of another method of controlling inter-cell signal interference according to an example. FIG. 4B is a second flowchart of another method of controlling inter-cell signal interference according to an example. FIG. 4C is a flowchart of acquiring configuration information of a cell reference signal according to an example. This example takes, with the above method provided by the example of the present disclosure, determining a position of a starting resource element of a DMRS when the UE does not determine in advance the position of the starting resource element of the DMRS in the synchronization block of any cell as an example for illustrative description. As shown in FIG. 4A, when the synchronization block is a synchronization block from a cell where the UE is to reside or a synchronization block from a present cell where the UE resides, a procedure of determining the position of the starting resource element of the DMRS includes following steps.

At step 401, a synchronization block is monitored.

At step 402, when the synchronization block is a synchronization block from a cell where the UE is to reside or a synchronization block from a present cell where the UE resides, a position of a starting resource element of a DMRS is determined by position blind decoding.

In an example, when the UE is not currently resided in any cell, and a cell to be resided is selected by monitoring a synchronization block, since the UE is not sure about a position of a starting resource element of a DMRS for the cell to be resided, the position of the starting resource element of the DMRS can be determined by performing position blind decoding for the DMRS in the synchronization block.

In an example, when the UE has resided in a certain cell, if the UE monitors a synchronization block from the present cell in which the UE resides, a position of a starting resource element of a DMRS in a synchronization block may be determined by performing position blind decoding for the DMRS in the synchronization block.

At step 403, the DMRS is acquired based on the position of the starting resource element.

At step 404, a PBCH is demodulated based on the DMRS to obtain PBCH content of the PBCH.

As shown in FIG. 4B, when the synchronization block is a synchronization block from a cell neighboring with the present cell where the UE resides, a procedure of determining a position of a starting resource element of a DMRS includes following steps.

At step 411, a synchronization block is monitored.

At step 412, when the synchronization block is a synchronization block from a cell neighboring with the present cell where the UE resides, a position of a starting resource element of a DMRS is determined based on configuration information of a cell reference signal for the neighboring cell.

In an example, when UE residing in the present cell monitors a synchronization block from a neighboring cell, the UE may determine the position of the starting resource element of the DMRS based on the configuration information of the cell reference signal for the neighboring cell.

In an example, the configuration information of the cell reference signal for the neighboring cell may be obtained as shown in the example in FIG. 4C. As shown in FIG. 4C, the obtaining includes the following steps.

At step 421, system information sent by a base station and carrying configuration information of a cell reference signal for a neighboring cell is received, and the configuration information of the cell reference signal for the neighboring cell includes a position of a starting resource element of a DMRS carried in the synchronization block of the neighboring cell.

In an example, an information unit can be defined in the system information to configure configuration information of a cell reference signal for a neighboring cell. For example, if there are 6 positions of the starting resource element of the DMRS, the position of the starting resource element of the DMRS for each cell may be indicated by a 3-bit information unit.

At step 422, the system information is analyzed to obtain the configuration information of the cell reference signal for the neighboring cell.

At step 413, the DMRS is acquired based on the position of the starting resource element.

At step 414, a PBCH is demodulated based on the DMRS to obtain PBCH content of the PBCH.

In this example, upon monitoring a synchronization block, the UE may determine the position of the starting resource element of the DMRS in the synchronization block from the present cell or the cell to be resided through blind decoding, or determine the position of the starting resource element of the DMRS for the neighboring cell from configuration information of the cell reference signal. Then, a PBCH is demodulated to obtain PBCH content. By configuring different subcarrier patterns of PBCH symbols for neighboring cells respectively, it can avoid the time domain resource and the frequency domain resource conflict between cell reference signals in the synchronization blocks for the present cell and the neighboring cell, and solve the interference problem caused by increased power due to improper configuration of cell reference signals in the 5G system.

Figure 5A:
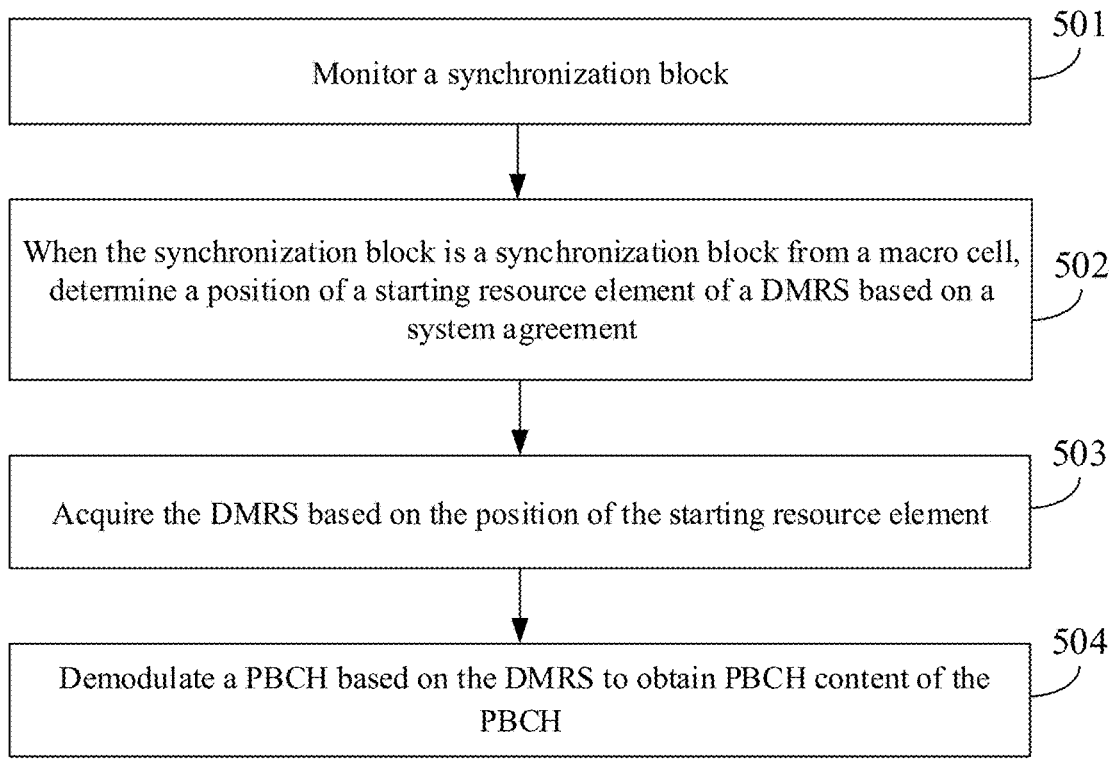
FIG. 5A is a first flowchart illustrating another method of controlling inter-cell signal interference according to an example.
Figure 5B:
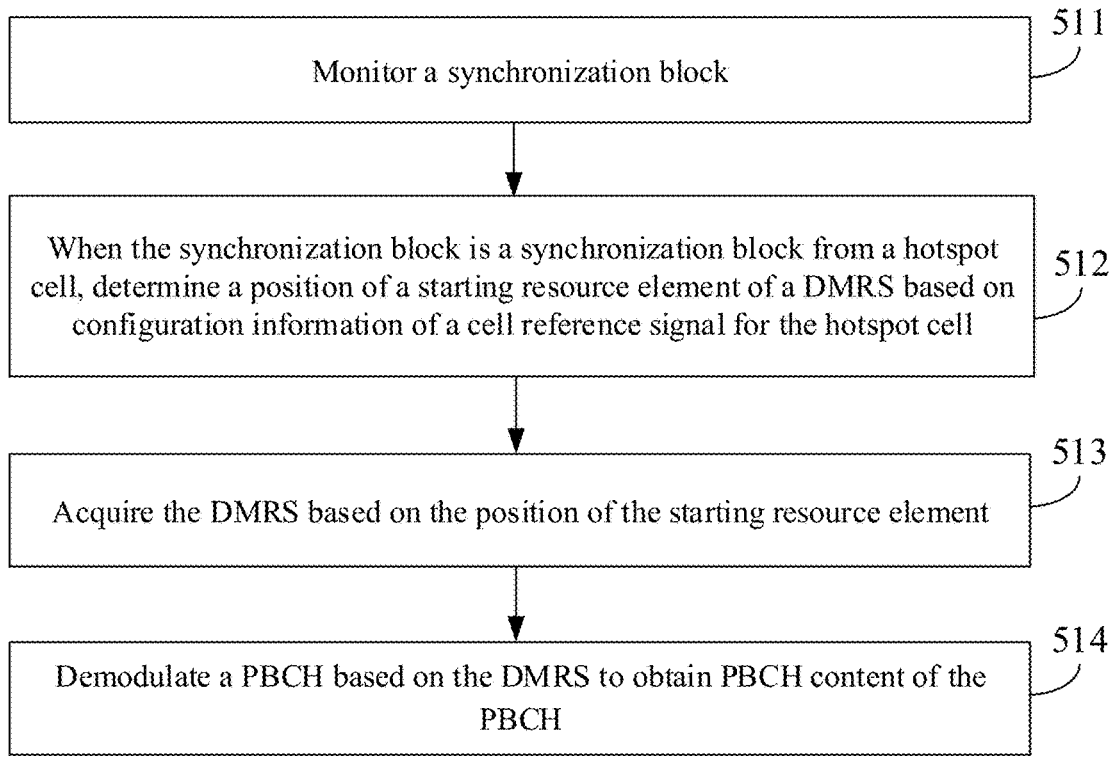
FIG. 5B is a second flowchart illustrating another method of controlling inter-cell signal interference according to an example.
Figure 5C:
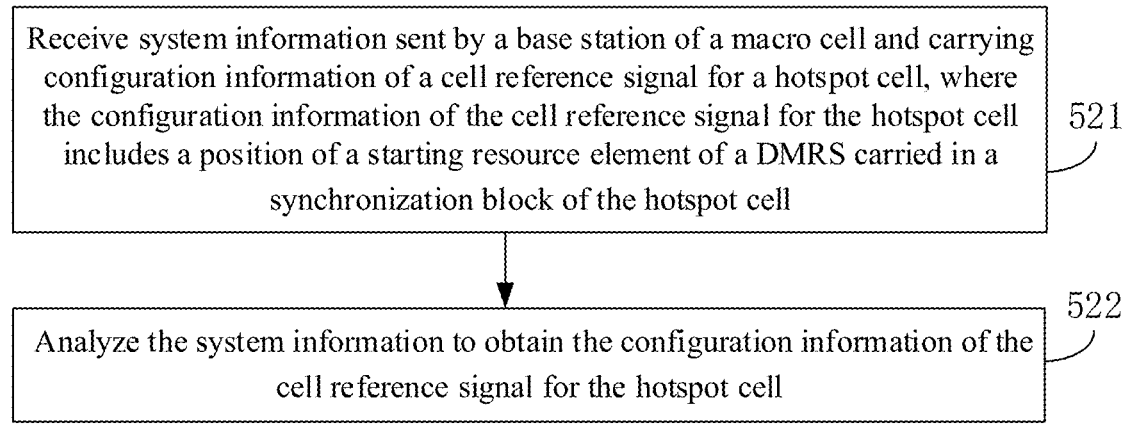
FIG. 5C is a flowchart illustrating acquiring configuration information of a cell reference signal according to an example.

FIG. 5A is a first flowchart illustrating another method of controlling inter-cell signal interference according to an example. FIG. 5B is a second flowchart illustrating another method of controlling inter-cell signal interference according to an example. FIG. 5C is a flowchart illustrating acquiring configuration information of a cell reference signal according to an example. This example takes, with the above method provided by the example of the present disclosure, determining a position of a starting resource element of a DMRS when a system previously agrees on the position of the starting resource element of the DMRS for each macro cell, while a position of the starting resource element of the DMRS for the hotspot cell is not previously agreed on in the system as an example for illustrative description. As shown in FIG. 5A, when the synchronization block is a synchronization block from a cell where the UE is to reside or a present cell of the UE, a procedure of determining the position of the starting resource element of the DMRS includes following steps.

At step 501, a synchronization block is monitored.

At step 502, when the synchronization block is a synchronization block from a macro cell, a position of a starting resource element of a DMRS is determined based on system agreement.

At step 503, the DMRS is acquired based on the position of the starting resource element.

At step 504, a PBCH is demodulated based on the DMRS to obtain PBCH content of the PBCH.

As shown in FIG. 5B, when the synchronization block is a synchronization block from a hotspot cell, a procedure of determining a position of a starting resource element of a DMRS includes following steps.

At step 511, a synchronization block is monitored.

At step 512, when the synchronization block is a synchronization block from a hotspot cell, a position of a starting resource element of a DMRS is determined based on configuration information of a cell reference signal for the hotspot cell.

In an example, since the UE generally does not know the configuration of the hotspot cell by default, the base station of the macro cell generally is to perform configuration for each hotspot cell within its coverage area in the system information, so that the UE monitors and searches for the hotspot cell and resides in the hotspot cell.

In an example, the base station of the macro cell may configure the configuration information of the cell reference signal for the hotspot cell in the system information.

In an example, the configuration information of the cell reference signal for the hotspot cell may be obtained as shown in the example in FIG. 5C. As shown in FIG. 5C, the obtaining includes the following steps.

At step 521, system information sent by a base station of a macro cell and carrying configuration information of the cell reference signal for a hotspot cell is received, and the configuration information of the cell reference signal for the hotspot cell includes a position of a starting resource element of a DMRS carried in the synchronization block of the hotspot cell.

In an example, when a user resides in a hotspot cell, system information may also be used to indicate to the UE configuration information of a cell reference signal for a neighboring hotspot cell.

At step 522, the system information is analyzed to obtain the configuration information of the cell reference signal for the hotspot cell.

At step 513, the DMRS is acquired based on the position of the starting resource element.

At step 514, a PBCH is demodulated based on the DMRS to obtain PBCH content of the PBCH.

In this example, upon monitoring a synchronization block from a macro cell, the UE may determine the position of the starting resource element of the DMRS in the synchronization block from the macro cell based on the system agreement. Upon monitoring a synchronization block from a hotspot cell, the UE may determine the position of the starting resource element of the DMRS for the hotspot cell through the configuration information of the cell reference signal. Since the UE does not determine the position of the starting resource element of the DMRS through blind decoding, a calculation amount by the UE can be reduced. By configuring different subcarrier patterns of PBCH symbols for neighboring cells respectively, it can avoid the time domain resource and the frequency domain resource conflict between cell reference signals in the synchronization blocks for the present cell and the neighboring cell, and solve the interference problem caused by increased power due to improper configuration of cell reference signals in the 5G system.

Figure 6:
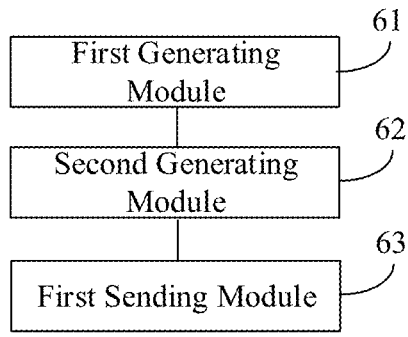
FIG. 6 is a block diagram illustrating an apparatus for controlling inter-cell signal interference according to an example.

FIG. 6 is a block diagram illustrating an apparatus for controlling inter-cell signal interference according to an example, and the apparatus is applied to a base station. As shown in FIG. 6, the apparatus for controlling inter-cell signal interference includes:

a first generating module 61 configured to generate a subcarrier pattern of PBCH symbols for a present cell based on an agreed DMRS configuration mode, every N resource elements in the subcarrier pattern of the PBCH symbols including one resource element for a DMRS and (N−1) resource elements for a PBCH, where N is a natural number greater than 2;

a second generating module 62 configured to generate a synchronization block of the present cell based on the subcarrier pattern of the PBCH symbols for the present cell, generated by the first generating module 61; and a first sending module 63 configured to send the synchronization block of the present cell, generated by the second generating module 62, directionally by beam sweeping.

A transmission window corresponding to the synchronization block of the present cell and/or a position of a starting resource element of a DMRS carried in the synchronization block of the present cell is different from a transmission window corresponding to a synchronization block of a neighboring cell and/or a position of a starting resource element of the DMRS carried in the synchronization block of the neighboring cell.

Figure 7:
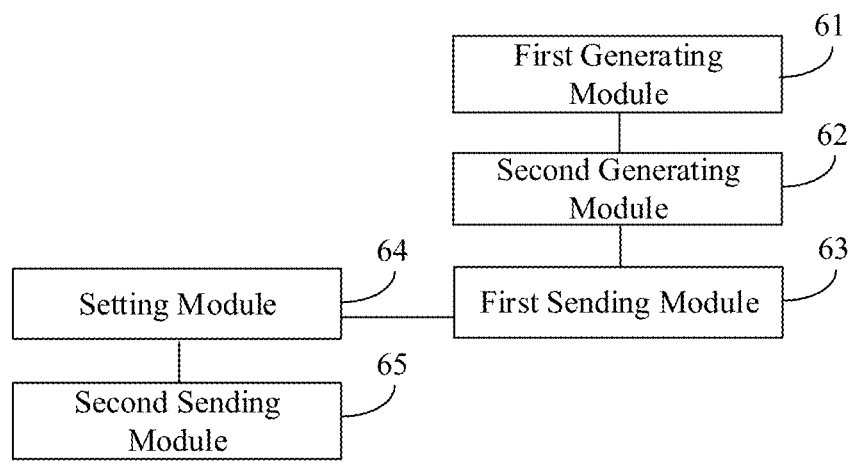
FIG. 7 is a block diagram illustrating another apparatus for controlling inter-cell signal interference according to an example.

FIG. 7 is a block diagram illustrating another apparatus for controlling inter-cell signal interference according to an example. As shown in FIG. 7, based on the example of FIG. 6, in an example, the apparatus also includes:

a setting module 64 configured to set a transmission window corresponding to the synchronization block of the present cell to be different from a transmission window corresponding to a synchronization block of a neighboring cell, and/or set a position of a starting resource element of a DMRS in the synchronization block of the present cell to be different from a position of a starting resource element of the DMRS carried in the synchronization block of the neighboring cell.

In an example, the apparatus also includes:

a second sending module 65 configured to send system information carrying configuration information of a cell reference signal for a neighboring cell to UE, where the configuration information includes a position of a starting resource element of a DMRS in a synchronization block of the neighboring cell.

In an example, the agreed DMRS configuration mode includes:

the DMRSs being evenly interspersed across a full bandwidth of the PBCH; or the DMRSs being interspersed across the bandwidth of the PBCH except a portion coincident with a bandwidth of a secondary synchronization signal in the synchronization block.

Figure 8:
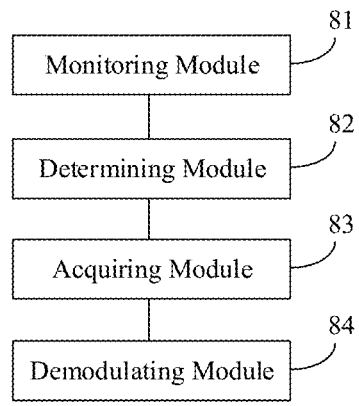
FIG. 8 is a block diagram illustrating an apparatus for controlling inter-cell signal interference according to an example.

FIG. 8 is a block diagram illustrating an apparatus for controlling inter-cell signal interference according to an example, and the apparatus is applied to UE. As shown in FIG. 6, the apparatus for controlling inter-cell signal interference includes:

a monitoring module 81 configured to monitor a synchronization block;

a determining module 82 configured to determine a position of a starting resource element of a DMRS for demodulating a PBCH carried in the synchronization block, which is monitored by the monitoring module 81;

an acquiring module 83 configured to acquire the DMRS based on the position of the starting resource element, which is determined by the determining module 82; and a demodulating module 84 configured to demodulate the PBCH based on the DMRS, which is acquired by the acquiring module 83, to obtain PBCH content of the PBCH.

Figure 9:
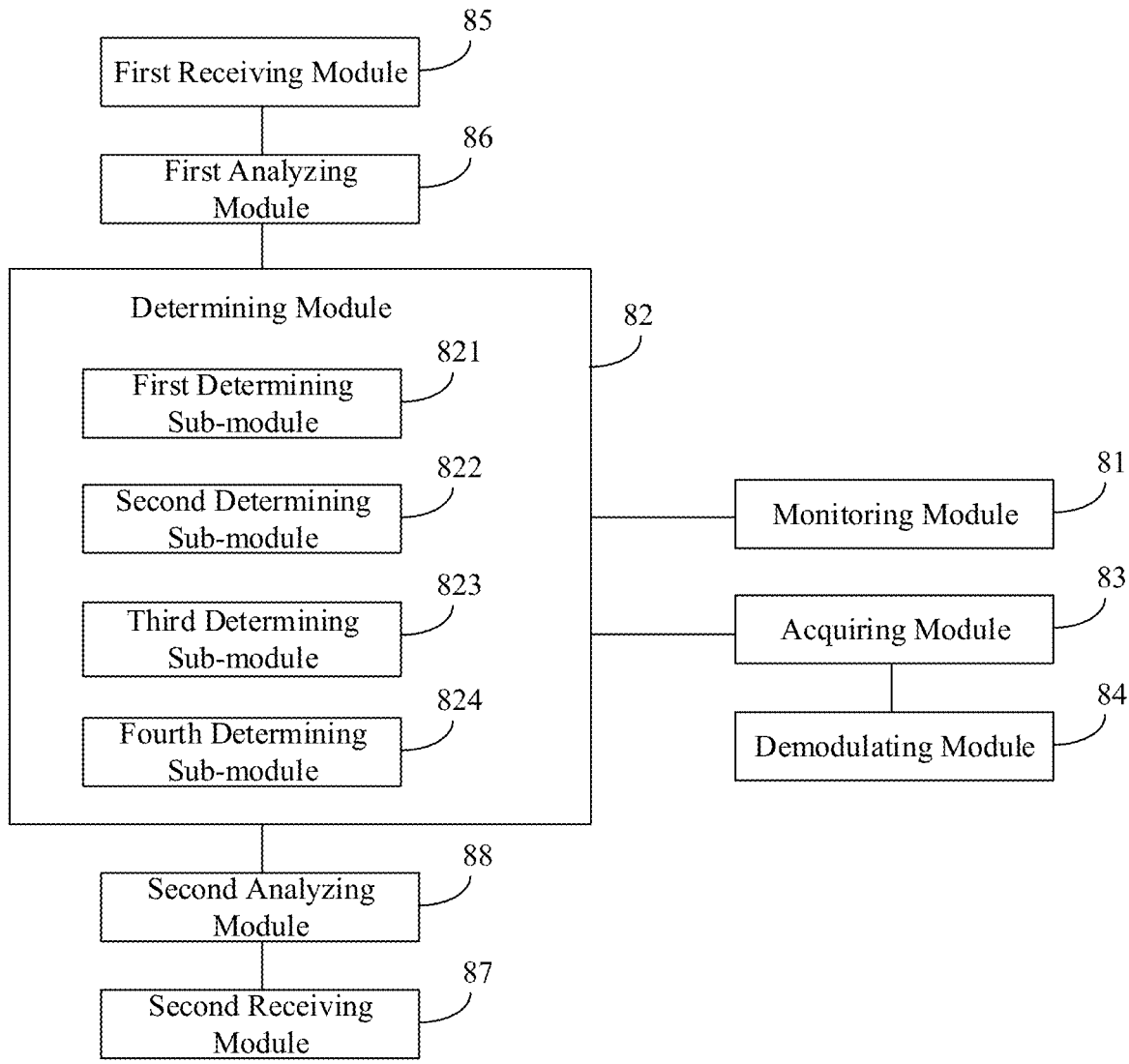
FIG. 9 is a block diagram illustrating another apparatus for controlling inter-cell signal interference according to an example.

FIG. 9 is a block diagram illustrating another apparatus for controlling inter-cell signal interference according to an example. As shown in FIG. 9, based on the example of FIG. 8, in an example, the determining module 82 includes:

a first determining sub-module 821 configured to, when the synchronization block is a synchronization block from a cell where the UE is to reside or a present cell associated with the UE, determine the position of the starting resource element of the DMRS by position blind decoding.

In an example, the determining module 82 includes:

a second determining sub-module 822 configured to, when the synchronization block is a synchronization block from a neighboring cell of the present cell where the UE resides, determine the position of the starting resource element of the DMRS based on configuration information of a cell reference signal for the neighboring cell.

In an example, the apparatus also includes:

a first receiving module 85 configured to receive system information sent by a base station and carrying the configuration information of the cell reference signal for the neighboring cell, where the configuration information of the cell reference signal for the neighboring cell includes a position of a starting resource element of a DMRS carried in the synchronization block of the neighboring cell; and a first analyzing module 86 configured to analyze the system information, received by the first receiving module 85, to obtain the configuration information of the cell reference signal for the neighboring cell.

In an example, the determining module 82 includes:

a third determining sub-module 823 configured to, when the synchronization block is a synchronization block from a macro cell, determine the position of the starting resource element of the DMRS based on a system agreement.

In an example, the determining module 82 includes:

a fourth determining sub-module 824 configured to, when the synchronization block is a synchronization block from a hotspot cell, determine the position of the starting resource element of the DMRS based on configuration information of a cell reference signal for the hotspot cell.

In an example, the apparatus also includes:

a second receiving module 87 configured to receive system information sent by a base station of the macro cell and carrying the configuration information of the cell reference signal for the hotspot cell, where the configuration information of the cell reference signal for the hotspot cell includes a position of a starting resource element of a DMRS carried in the synchronization block of the hotspot cell; and a second analyzing module 88 configured to analyze the system information, received by the second receiving module 87, to obtain the configuration information of the cell reference signal for the hotspot cell.

Regarding the apparatuses in the above examples, the specific manner in which each module performs operations has been described in detail in the examples of the methods, and will not be described in detail here.

Figure 10:
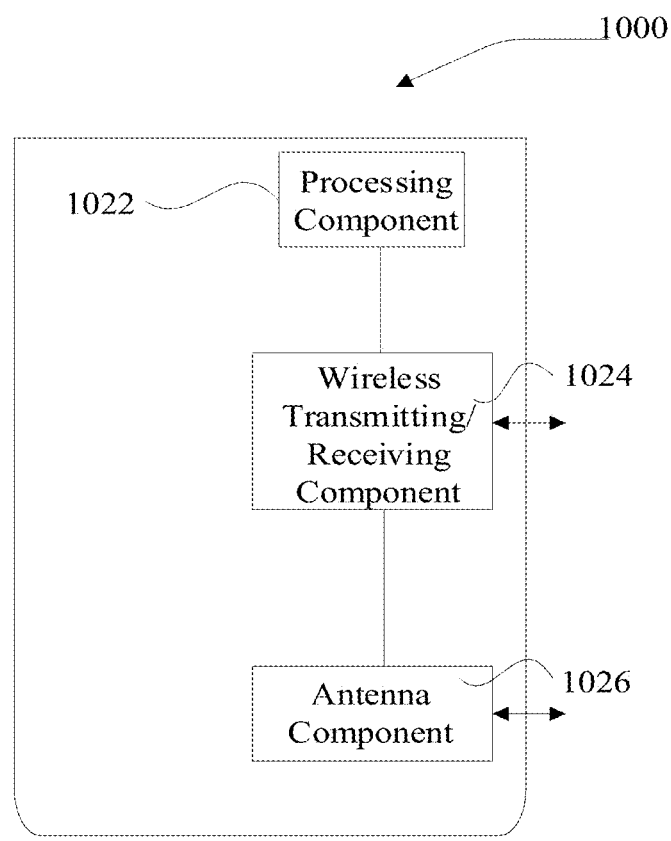
FIG. 10 is a block diagram illustrating an apparatus suitable for controlling inter-cell signal interference according to an example.

FIG. 10 is a block diagram illustrating an apparatus suitable for controlling inter-cell signal interference according to an example. An apparatus 1000 may be provided as a base station. Referring to FIG. 10, the apparatus 1000 includes a processing component 1022, a wireless transmitting/receiving component 1024, an antenna component 1026, and a signal processing portion dedicated to a wireless interface. The processing component 1022 may further include one or more processors.

One of the processors in the processing component 1022 may be configured to perform the above method for controlling inter-cell signal interference.

In an example, there is also provided a non-transitory computer-readable storage medium including instructions, which may be executed by the processing component 1022 of the apparatus 1000 to complete the method described in the first aspect above. For example, the non-transitory computer-readable storage medium may be a ROM, a random access memory (RAM), a CD-ROM, a magnetic tape, a floppy disk, an optical data storage device, and the like.

Figure 11:
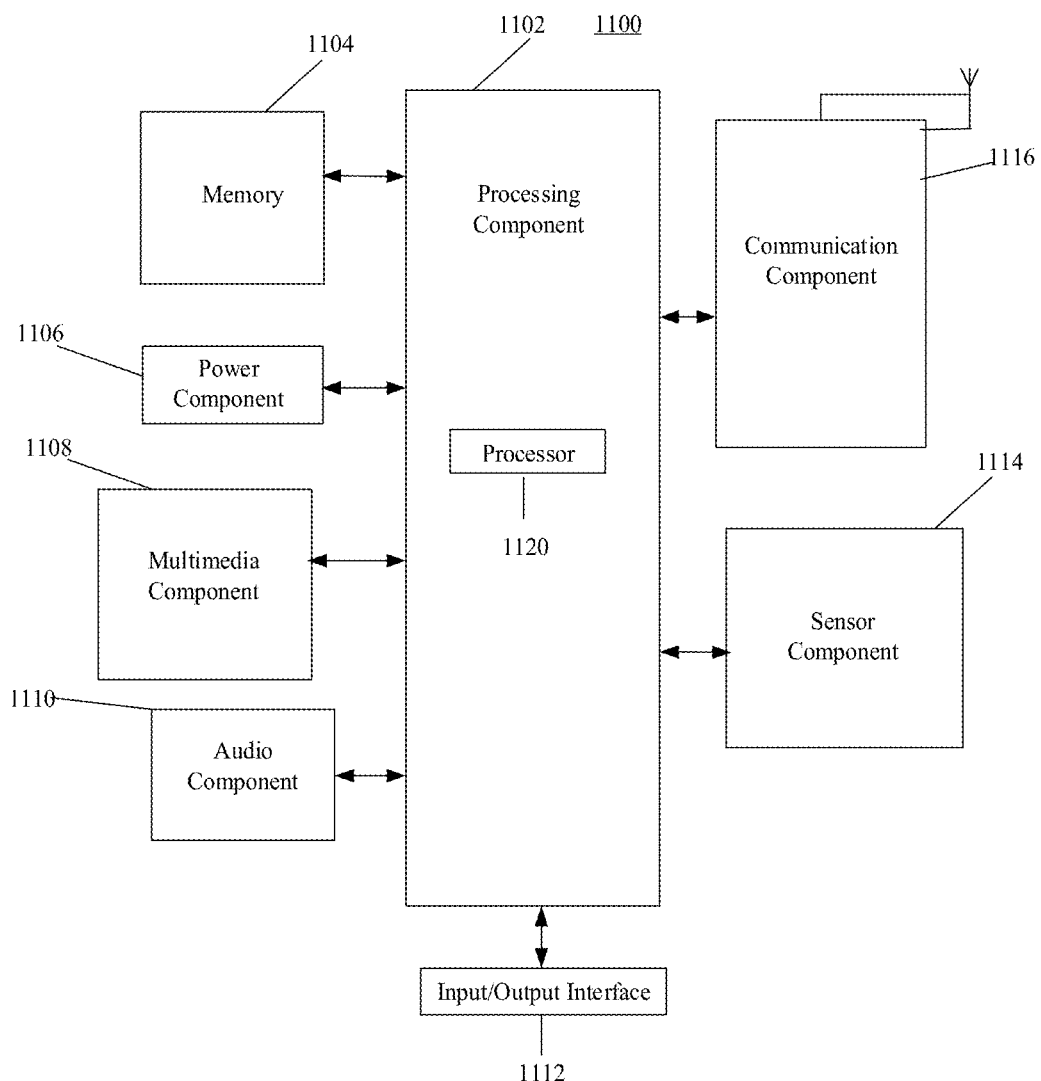
FIG. 11 is a block diagram illustrating an apparatus suitable for controlling inter-cell signal interference according to an example.

FIG. 11 is a block diagram illustrating an apparatus suitable for controlling inter-cell signal interference according to an example. For example, an apparatus 1100 may be UE, for example, a smart phone.

Referring to FIG. 11, the apparatus 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the apparatus 1100, such as the operations associated with display, phone call, data communications, camera operations, and recording operations. The processing component 1102 may include one or more processors 1120 to execute instructions, to perform all or part of the steps of the above method. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the apparatus 1100. Examples of such data include instructions for any applications or methods operated on the apparatus 1100, messages, pictures, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the apparatus 1100. The power component 1106 may include a power management system, one or more power sources, and any other components associated with the generation, management, and distribution of power in the apparatus 1100.

The multimedia component 1108 includes a screen providing an output interface between the apparatus 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. When the apparatus 1100 is in an operation mode, such as a shooting mode or a video mode, the front camera and/or the rear camera can receive external multimedia data. Each front and rear camera can be a fixed optical lens system or have focal length and optical zoom capability.

The audio component 1110 is configured to output and/or input audio signals. For example, the audio component 1110 includes a microphone (MIC) configured to receive an external audio signal when the apparatus 1100 is in an operation mode, such as a call mode, a recording mode, and a voice recognition mode. The received audio signal may be further stored in the memory 1104 or transmitted via the communication component 1116. In some examples, the audio component 1110 further includes a speaker to output audio signals.

The I/O interface 1112 provides an interface between the processing component 1102 and peripheral interface modules, such as a keyboard, a click wheel, buttons, and the like. These buttons may include, but are not limited to, a home button, a volume button, a start button, and a lock button.

The sensor component 1114 includes one or more sensors to provide status assessments of various aspects of the apparatus 1100. For instance, the sensor component 1114 may detect an on/off status of the apparatus 1100, relative positioning of components, e.g., the display and the keypad, of the apparatus 1100, a change in position of the apparatus 1100 or a component of the apparatus 1100, a presence or absence of user contact with the apparatus 1100, an orientation or an acceleration/deceleration of the apparatus 1100, and a change in temperature of the apparatus 1100. The sensor component 1114 may include an optical sensor, such as a Complementary Metal-Oxide-Semiconductor (CMOS) or Charged Coupled Device (CCD) image sensor which is used in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the apparatus 1100 and other devices. The apparatus 1100 can access a wireless network based on a communication standard, such as Wi-Fi, 2G, or 3G, or a combination thereof. In one exemplary embodiment, the communication component 1116 receives a broadcast signal or broadcast associated information from an external broadcast management system via a broadcast channel. In one exemplary embodiment, the communication component 1116 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, to perform the above method of controlling inter-cell signal interference described in the second aspect.

In exemplary embodiments, there is also provided a non-transitory computer-readable storage medium including instructions, such as included in the memory 1104, executable by the processor 1120 in the apparatus 1100 to perform the above method described in the second aspect. For example, the non-transitory computer-readable storage medium may be a ROM, a RAM, a CD-ROM, a magnetic tape, a floppy disc, an optical data storage device, and the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the disclosure only be limited by the appended claims.

The invention claimed is:

1. A method of controlling inter-cell signal interference, the method being applied to a base station and comprising:
generating a subcarrier pattern of Physical Broadcast Channel (PBCH) symbols for a present cell based on an agreed Demodulation Reference Signal (DMRS) configuration mode, every N resource elements in the subcarrier pattern of the PBCH symbols comprising one resource element for a DMRS and (N−1) resource elements for a PBCH, wherein N is a natural number greater than 2;
generating a synchronization block of the present cell based on the subcarrier pattern of the PBCH symbols for the present cell;
sending the synchronization block of the present cell directionally by beam sweeping; and
sending, by the present cell, system information carrying configuration information of a cell reference signal for a neighboring cell to User Equipment (UE), wherein the configuration information comprises a position of a starting resource element of a DMRS in a synchronization block of the neighboring cell;
wherein the base station is further configured to reduce density of the DMRS in the subcarrier pattern, such that interference caused by increased power due to improper configuration of DMRSs in the synchronization block is reduced, and signal interference between neighboring cells is avoided.

2. The method according to claim 1, further comprising:
setting a transmission window corresponding to the synchronization block of the present cell to be different from a transmission window corresponding to a synchronization block of the neighboring cell; or
setting a position of a starting resource element of a DMRS in the synchronization block of the present cell to be different from a position of a starting resource element of the DMRS carried in the synchronization block of the neighboring cell.

3. The method according to claim 1, wherein the agreed DMRS configuration mode comprises:
the DMRSs being evenly interspersed across a full bandwidth of the PBCH; or
the DMRSs being interspersed across the bandwidth of the PBCH except a portion coincident with a bandwidth of a secondary synchronization signal in the synchronization block.

4. A base station, comprising:
a processor; and
a memory for storing instructions executable by the processor,
wherein the processor is configured to:
generate a subcarrier pattern of Physical Broadcast Channel (PBCH) symbols for a present cell based on an agreed Demodulation Reference Signal (DMRS) configuration mode, every N resource elements in the subcarrier pattern of the PBCH symbols comprising one resource element for a DMRS and (N−1) resource elements for a PBCH, wherein N is a natural number greater than 2;
generate a synchronization block of the present cell based on the subcarrier pattern of the PBCH symbols for the present cell;
send the synchronization block of the present cell directionally by beam sweeping; and
send system information carrying configuration information of a cell reference signal for a neighboring cell to User Equipment (UE), wherein the configuration information comprises a position of a starting resource element of a DMRS in a synchronization block of the neighboring cell;
wherein the base station is further configured to reduce density of the DMRS in the subcarrier pattern, such that interference caused by increased power due to improper configuration of DMRSs in the synchronization block is reduced, and signal interference between neighboring cells is avoided.

5. The base station according to claim 4, wherein the processor is further configured to:
set a transmission window corresponding to the synchronization block of the present cell to be different from a transmission window corresponding to a synchronization block of the neighboring cell; or
set a position of a starting resource element of a DMRS in the synchronization block of the present cell to be different from a position of a starting resource element of the DMRS carried in the synchronization block of the neighboring cell.

6. A communication system, comprising a base station and user equipment (UE), wherein the base station is configured to
generate a subcarrier pattern of Physical Broadcast Channel (PBCH) symbols for a present cell based on an agreed Demodulation Reference Signal (DMRS) configuration mode, every N resource elements in the subcarrier pattern of the PBCH symbols comprising one resource element for a DMRS and (N−1) resource elements for a PBCH, wherein N is a natural number greater than 2;
generate a synchronization block of the present cell based on the subcarrier pattern of the PBCH symbols for the present cell;
send the synchronization block of the present cell directionally by beam sweeping; and
sending, by the present cell, system information carrying configuration information of a cell reference signal for a neighboring cell to the UE, wherein the configuration information comprises a position of a starting resource element of a DMRS in a synchronization block of the neighboring cell;
wherein density of the DMRS in the subcarrier pattern is reduced, such that interference caused by increased power due to improper configuration of DMRSs in the synchronization block is reduced, and signal interference between neighboring cells is avoided.

7. The method according to claim 1, wherein for each macro cell, a position of a starting resource element of the DMRS for the cell is agreed by a system.

8. The method according to claim 7, wherein a position of a starting resource element of the DMRS for a hotspot cell is indicated by the macro cell through system information.

9. The base station according to claim 4, wherein the agreed DMRS configuration mode comprises:
the DMRSs being evenly interspersed across a full bandwidth of the PBCH; or
the DMRSs being interspersed across the bandwidth of the PBCH except a portion coincident with a bandwidth of a secondary synchronization signal in the synchronization block.

10. The base station according to claim 4, wherein for each macro cell, a position of a starting resource element of the DMRS for the cell is agreed by a system.

11. The base station according to claim 10, wherein a position of a starting resource element of the DMRS for a hotspot cell is indicated by the macro cell through system information.

12. The communication system according to claim 6, wherein the base station is further configured to:
set a transmission window corresponding to the synchronization block of the present cell to be different from a transmission window corresponding to a synchronization block of the neighboring cell; or
set a position of a starting resource element of a DMRS in the synchronization block of the present cell to be different from a position of a starting resource element of the DMRS carried in the synchronization block of the neighboring cell.

13. The communication system according to claim 6, wherein the agreed DMRS configuration mode comprises:
the DMRSs being evenly interspersed across a full bandwidth of the PBCH; or
the DMRSs being interspersed across the bandwidth of the PBCH except a portion coincident with a bandwidth of a secondary synchronization signal in the synchronization block.

14. The communication system according to claim 6, wherein for each macro cell, a position of a starting resource element of the DMRS for the cell is agreed by the system.

15. The communication system according to claim 14, wherein a position of a starting resource element of the DMRS for a hotspot cell is indicated by the macro cell through system information.

* * * * *